United States Patent [19]

Galati et al.

[11] Patent Number: 4,926,184

[45] Date of Patent: May 15, 1990

[54] ANGLE MEASUREMENT DEVICE FOR AMPLITUDE MONOPULSE RECEIVERS

[75] Inventors: Gaspare Galati; Giovanni Jacovitti, both of Rome, Italy

[73] Assignee: Selenia Industrie Elettroniche Associate S.p.A., Rome, Italy

[21] Appl. No.: 170,055

[22] Filed: Mar. 16, 1988

Related U.S. Application Data

[63] Continuation of Ser. No. 931,734, Nov. 17, 1986, abandoned.

[51] Int. Cl.$^5$ .............................................. G01S 13/44
[52] U.S. Cl. ...................................... 342/149; 342/152
[58] Field of Search .................. 342/37, 149, 152, 427

[56] References Cited

U.S. PATENT DOCUMENTS

| | | | |
|---|---|---|---|
| 3,728,730 | 4/1973 | Takao et al. | 342/442 |
| 3,927,406 | 12/1975 | Bruder | 342/92 |
| 4,139,850 | 2/1979 | Charlot et al. | 342/152 |
| 4,170,774 | 10/1979 | Schaefer | 342/94 |
| 4,296,415 | 10/1981 | Pelton et al. | 342/94 |
| 4,334,224 | 6/1982 | Gordon | 342/37 |
| 4,366,483 | 12/1982 | Hagedon et al. | 342/427 |
| 4,418,349 | 11/1983 | Höfgen et al. | 342/37 |
| 4,527,161 | 7/1985 | Wehner | 342/152 |
| 4,591,862 | 5/1986 | Parkhurst et al. | 342/427 |
| 4,638,319 | 1/1987 | Chua | 342/417 |
| 4,689,623 | 8/1987 | Schwab et al. | 342/39 |
| 4,719,465 | 1/1988 | Kuroda | 342/151 |
| 4,796,031 | 1/1989 | Koki | 342/148 |

*Primary Examiner*—Thomas H. Tarcza
*Assistant Examiner*—John B. Sotomayor
*Attorney, Agent, or Firm*—Herbert Dubno

[57] ABSTRACT

Device for angle measurement for inclusion within a monopulse amplitude comparison radar receiver for particular application within secondary radars. In essence it consists of a log ($\Sigma$) signal comparator (9) against a detection threshold, which is meant to enable further processing; of two-analog-numerical converters (10, 11), a codes (12), receiving outputs $\Sigma$ and $\Delta$ from converters above, which provides the calculation of target azimuth.

2 Claims, 3 Drawing Sheets

ANGLE MEASUREMENT DEVICE FOR AMPLITUDE MONOPULSE RECEIVERS

This is a continuation of co-pending application Ser. No. 931,734 filed on Nov. 17, 1986, now abandoned.

FIELD OF THE INVENTION

The present invention relates to an azimuthal-angle measurement device, to be used in an amplitude comparison monopulse radar receiver. The invention is in the field of radar systems, in particular secondary surveillance radars.

BACKGROUND OF THE INVENTION

This type of radar is known in the art as SSR and we shall use this abbreviation for convenience.

It is a known fact that an SSR can detect aircraft equipped with transponders by decoding relevant replies, measure the time of arrival and the azimuthal angle of arrival and locate the aircraft.

The device which is the subject of this invention, refers to the azimuthal angle measurement problem, for which a very high accuracy is required so as not to incur excessively large aircraft location errors, especially at large detection ranges.

Until now, the high accuracy has been achieved by the use of monopulse receivers. Such receivers can evaluate the azimuth of each return pulse by comparing the signals received by two antenna patterns referred to, respectively, as ($\Sigma$) and ($\Delta$).

For information purposes, a few well-known works related to a number of monopulse receivers and to the relevant reasons for the error of concern are mentioned:

G. Jacovitti: "Performance Analysis of Monopulse Receivers for secondary surveillance Radar, IEEE Trans. On Aerospace & Electronic Systems, vol. AES-19, No 6 November 1983, pp. 884–897.

The device in question is particularly applicable to amplitude comparison receivers, called L1 in the Jacovitti article.

R. J. Plant, M. C. Stevens: "A Practical Application of Monopulse Processing to the solution of SSR Problems, International Conf. of Radar, Paris, May 21/24, 1984 pp. 56-60; and G. Galati, C. Benedetti, E. Giaccari, M. Momo: "The Evolution of SSR" Proceedings of the Int. Radar symp. India (IRSI-83) Oct. 9–12, 1983 Bangalore, pp. 416–423.

BRIEF DESCRIPTION OF THE DRAWING

The above objects, features and advantages of our invention will become more readily apparent from the following description, reference being made to the accompanying drawing in which.

SPECIFIC DESCRIPTION

Figure 1:
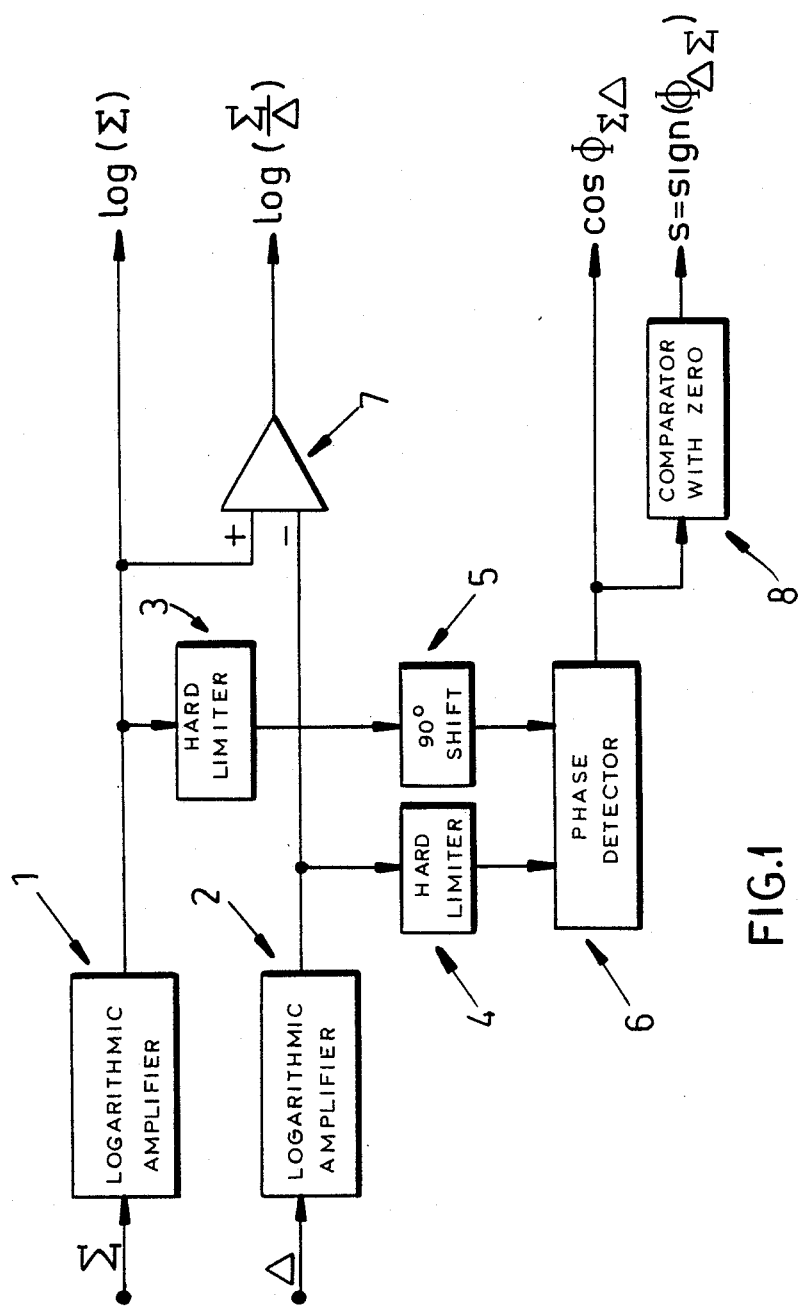
FIGS. 1, 2 and 3 are block circuit diagrams illustrating the invention.

In an amplitude comparison monopulse receiver of conventional construction, the IF receiver and detectors provide the following three signals as output: log ($\Sigma$), log ($\Delta$) and sign ($\Phi_{\Sigma\Delta}$). From these, detection and azimuth measurement are performed. The latter, in the prior art techniques, is obtained by the following relation:

$$\theta = S k_m b^{-z} \qquad (1)$$

where:

$\theta$ is the measured azimuth, b is the base of the logarithmic representation (for decimal logarithms, in common use, b = 10), z is the logarithm of the ratio of the sum and difference amplitude channels, S is the sign of the relative phase between sum and difference channel: $S = \text{Sign} (\cos \Phi_{\Sigma\Delta})$, and $K_m$ is a constant parameter of the systems.

The limits imposed by the prior art techniques are related to the use of the sign of the relative phase; in fact, for low values of the signal to noise ratio (targets quite far from the radar) and low $\Delta$ values (targets close to the monopulse antenna boresight) the difference channel signal is masked by the receiver noise. In this situation, there is the greatest uncertainty as to sign and, therefore, an appreciable increase in overall r.m.s. error, which may be verified in an analytical, simulating or experimental manner (see GALATI et al, supra).

OBJECT OF THE INVENTION

The object of the present invention is, therefore, a device capable of modifying the amplitude monopulse receiver so as to improve its azimuth accuracy, particularly for distant targets (and therefore for low signal to noise ratio) close to the antenna boresight.

Such a device may be applied to any amplitude monopulse receiver and its application is particularly convenient in SSRs where azimuth precision requirements are very stringent.

DESCRIPTION OF THE INVENTION

The principle of operation of the device in question is based on the replacement within algorithm (1) of the quantity $S = \text{sign} (\cos \Phi_{\Sigma\Delta})$ with $C = \cos \Phi_{\Sigma\Delta}$ in fact:

$$\theta = C K_m b^{-z}$$

Therefore, azimuth angle error in the most critical operational conditions described above, is drastically reduced because here the relative phase ranges significantly from 0° to 180° (according to whether the aircraft is to the right or the left of the boresight) and its cosine is almost zero. Therefore, measured values of the relation (2) shows azimuth values close to zero can result and, therefore, also an appreciable error reduction is achieved. Seen from another viewpoint, relation (2) corresponds to the scalar product of the sum signal vector and the difference vector; considering the thermal noise which adds to the latter, which is most relevant in critical operative situations, only its component parallel to the sum vector introduces an error, as the orthogonal one does not contribute to the result of the scalar product. There follows an accuracy improvement compared to relation (1). The device presented is, therefore, capable of effecting an estimate of azimuth by implementing relation (2) in accordance with the schematics shown in FIGS. 1 and 2.

Figure 2:
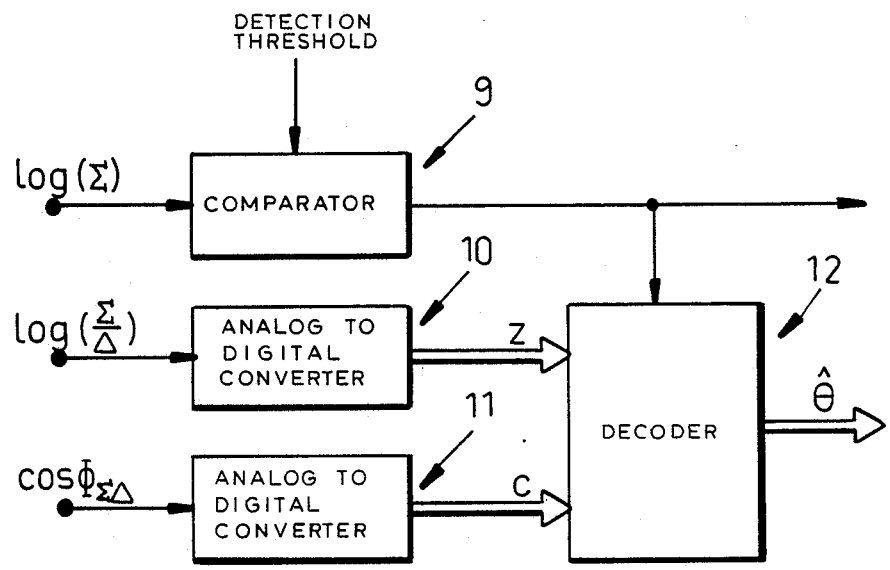
Figure 3:
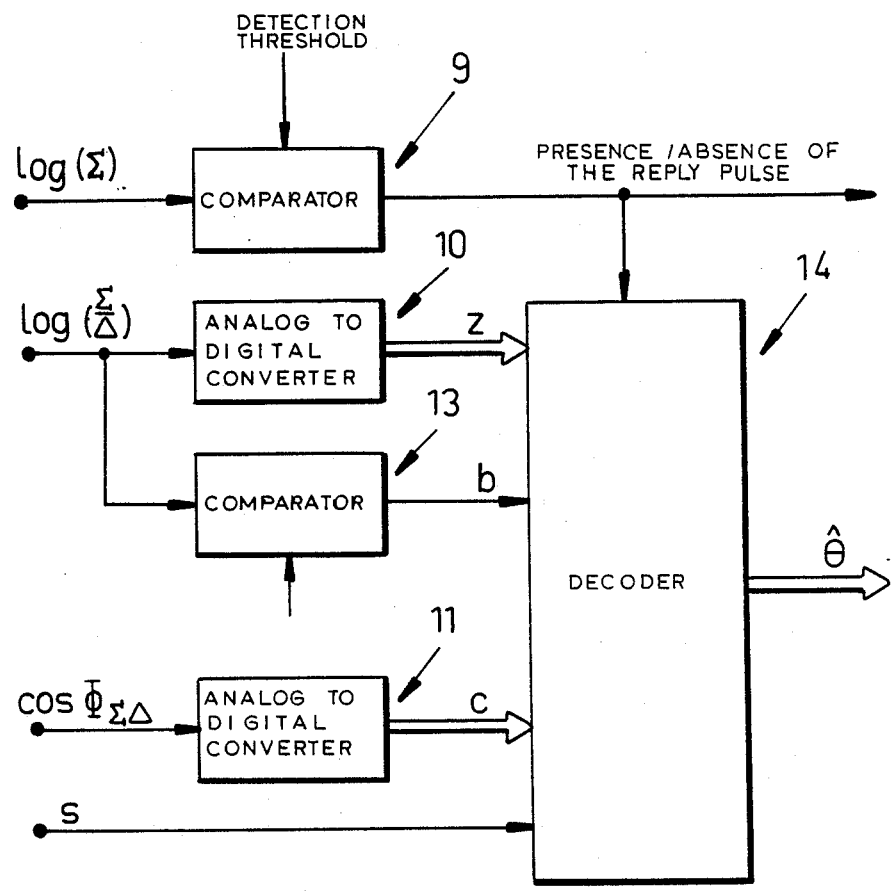

With respect to the FIGURES relating to the present invention:

FIG. 1 shows the intermediate frequency receiver schematic and detectors;

FIG. 2 shows the schematic of the processor for the angle measurement in one of its preferred forms, here called "Variant A"; and FIG. 3 shows the schematic of the processor for angle measurement in another of its preferred versions here called "Variant B".

FIGS. 1, 2 and 3 show the present invention with reference to some of its presently preferred forms which are presented as illustrations only, but are not limited to these alone.

FIG. 1 shows the intermediate frequency receiver, made up of two logarithmic amplifiers 1, 2 for the sum and difference. Hard limiters 3 and 4 are meant to keep information of the phase of the two channels only. A phase shifter 5 rotates channel information by 90°. The two limited signals, one of which is phase shifted, are sent to a phase detector 6 which passes a video signal proportional to the sine of the phase difference of its inputs and, therefore, to the cosine of the phase difference $\Phi_{\Sigma\Delta}$ of the two sum and difference channels. A comparator 8 compares this cosine with zero and provides the sign of $\Phi_{\Sigma\Delta}$: sign $\Phi_{\Sigma\Delta}$, i.e. a signal equal to $+1$ if cos $\Phi_{\Sigma\Delta} > 0$ and a signal equal to $-1$ of cos $\Phi_{\Sigma\Delta} < 0$.

Finally, subtractor 7 of the outputs of blocks 1 and 2 provides a signal, log $$\frac{(\Sigma)}{\Delta}$$

which, together with cos $\Phi_{\Sigma\Delta}$, sign $\Phi_{\Sigma\Delta}$ and block (1) output (signal log ($\Sigma$)) is sent to the processor, which is described in an illustrative manner, but is not confined to this alone.

In FIG. 2, block 9 is the comparator of signal log ($\Sigma$) having a detection threshold which serves the purpose of enabling signal processing. If log ($\Sigma$) is greater than the threshold, the comparator output is a logic level indicating detection.

Signal log $$\frac{(\Sigma))}{\Delta}$$

is sent to block 10 which is an analog-to-digital converter; signal cos $\Phi_{\Sigma\Delta}$ is sent to block 11 which is another analog-to-digital converter, outputs Z and C of two converters 10 and 11, respectively, are sent to decoder which, through use of techniques well known to those versed in the art of numeric processing, calculates target azimuth through relation (2).

The decoder 12 (FIG. 2) receives the digital values of the signal.

(a) log $\frac{(\Sigma)}{\Delta}$ (from block 10)

(b) cos $\Phi_{\Sigma\Delta}$ (from block 11)

(c) a signal which enables the process when the signal is greater than a threshold value.

Being that b and Km are known quantities (system parameters) the calculation of $\theta$ by formula (2) can be obtained based on:

$$\theta = C\,Km\,b^{-2} = \cos\Phi_{\Sigma}\,Km\left(b\exp-\left(\log\frac{\Sigma}{\Delta}\right)\right) \text{ or}$$

in substitution of the formula (1)

$$\theta = S\,Km\,b^{-2} = \text{Sign}(\cos\Phi_{\Sigma\Delta})\,Km\left(b\exp-\left(\log\frac{\Sigma}{\Delta}\right)\right)$$

The number of bits Np of the converter 11 is chosen as a trade-off between cost and azimuth accuracy; it should be noted that for Np=1 the result of monopulse processing in techniques previous to this invention is desired. Typical results of the trade-off are Np=2 and Np=4. The quantization intervals may not be uniform.

The device which is the subject of this invention may be modified (B Variant) for applications in which phase errors between sum and difference channels due to radar imperfections, are such as to make an attractive azimuth estimate through relation (1), i.e. the previous technique, when the critical conditions are not met, i.e. when the ratio S/N on the different channel is not too low and when the target is sufficiently off boresight.

To verify such an instance, a comparator of log ($\Sigma/\Delta$) signal with a threshold has been added to Variant B: if the signal falls below the threshold, it is decided that the critical situation is present and relation (2) is used, if not, relation (1) is adopted.

The invention in subject may be used in monopulse-type radars and, particularly, in Secondary Surveillance Radars (SSRs).

I claim:

1. An angle-measurement device in an amplitude-modulated monopulse radar receiver, comprising:

two logarithmic amplifiers connected to an antenna system and responsive to two antenna-pattern signals in the form of a sum and of a difference denoted as a sigma signal and a delta signal, respectively, for generating log sigma and log delta signals;

respective hard limiters connected to outputs of said logarithmic amplifiers and having respective outputs representing the phases of said sigma and delta signals;

a 90° phase shifter connected to an output of one of said hard limiters to effect a 90° phase shift of the signal outputted thereby;

a phase detector connected to an output of said 90° phase shifter and the output of the other of said hard limiters for outputting a signal representing the cosine of the phase difference between said sigma and delta signals;

a first analog-to-digital converter connected to an output of said phase detector for digitalizing said cosine;

a subtractor connected to said outputs of said logarithmic amplifiers for outputting a signal representing the logarithm of the quotient of said sigma and delta signals;

a second analog-to-digital converter connected to an output of said subtractor for digitalizing said signal representing the logarithm of said quotient;

a first comparator connected with the output of one of said logarithmic amplifiers for comparing the respective log signal with a detection threshold to provide an enabling signal;

a second comparator connected with the output of said subtractor for comparing the logarithm of the quotient with another threshold to output a signal representing the existence of a predetermined condition; and a third comparator connected with the output of said phase detector and having a zero input for generating a signal representing the sign of the cosine;

a decoder connected to said first and second analog-to-digital converters and to said first, second and third comparators and enabled by said enabling signal to provide angle measurement output selectively in accordance with the function:

$$\hat{\theta} = SK_m b^{-z} \quad (1),$$

and $$\hat{\theta} = CK_m b^{-z} \quad (2),$$

where
- $\hat{\theta}$ is the measured azimuth angle,
- b is the logarithm base,
- z is the logarithm of the quotient,
- S is the sign of the cosine,
- C is the cosine, and
- $K_m$ is a constant system parameter, in accordance with the output of said second comparator.

2. An angle-measurement device in an amplitude-modulated monopulse radar receiver, comprising:
  two logarithmic amplifiers connected to an antenna system and responsive to two antenna-pattern signals in the form of a sum and of a difference denoted as a sigma signal and a delta signal, respectively, for generating log sigma and log delta signals;
  respective hard limiters connected to outputs of said logarithmic amplifiers and having respective outputs representing the phases of said sigma and delta signals;
  a 90° phase shifter connected to an output of one of said hard limiters to effect a 90° phase shift of the signal outputted thereby;
  a phase detector connected to an output of said 90° phase shifter and the output of the other of said hard limiters for outputting a signal representing the cosine of the phase difference between said sigma and delta signals;
  a first analog-to-digital converter connected to an output of said phase detector for digitalizing said cosine;
  a subtractor connected to said outputs of said logarithmic amplifiers for outputting a signal representing the logarithm of the quotient of said sigma and delta signals;
  a second analog-to-digital converter connected to an output of said subtractor for digitalizing said signal representing the logarithm of said quotient;
  a comparator connected with the output of one of said logarithmic amplifiers for comparing the respective log signal with a detection threshold to provide an enabling signal; and
  a decoder connected to said first and second analog-to-digital converters and to said comparator and enabled by said enabling signal to provide angle measurement output selectively in accordance with the function:

$$\hat{\theta} = CK_m b^{-z},$$

where
- $\hat{\theta}$ is the measured azimuth angle,
- b is the logarithm base,
- z is the logarithm of the quotient,
- C is the cosine, and
- $K_m$ is a constant system parameter.

* * * * *